(12) United States Patent
Lin et al.

(10) Patent No.: US 8,154,604 B2
(45) Date of Patent: Apr. 10, 2012

(54) CAMERA MOTION PARAMETER RETRIEVING SYSTEM AND SOLVING PROCESS

(75) Inventors: Jia-Hung Lin, Hsinchu (TW);
Chih-Hung Kuo, Kaohsiung (TW);
Chia-Hung Yeh, Tai-Nan (TW);
Hsuan-Huei Shih, Taipei (TW)

(73) Assignee: Mavs Lab. Inc., Tau-Yuan (TW)

( * ) Notice: Subject to any disclaimer, the term of this patent is extended or adjusted under 35 U.S.C. 154(b) by 1643 days.

(21) Appl. No.: 11/502,512

(22) Filed: Aug. 11, 2006

(65) Prior Publication Data
US 2008/0036867 A1 Feb. 14, 2008

(51) Int. Cl.
*H04N 5/228* (2006.01)
*H04N 5/14* (2006.01)

(52) U.S. Cl. ..................... 348/208.1; 348/699

(58) Field of Classification Search ............... 348/208.6; 375/240.16, 240.01–240.29; 396/153
See application file for complete search history.

(56) References Cited

U.S. PATENT DOCUMENTS

| 6,236,682 B1* | 5/2001 | Ota et al. ............... 375/240.16 |
| 6,278,736 B1* | 8/2001 | De Haan et al. ......... 375/240.16 |
| 6,349,114 B1* | 2/2002 | Mory ....................... 375/240.21 |
| 7,433,588 B2* | 10/2008 | Oya ............................. 396/153 |

* cited by examiner

*Primary Examiner* — Gims Philippe
*Assistant Examiner* — Nathnael Aynalem
(74) *Attorney, Agent, or Firm* — Jackson IPG PLLC; Demian K. Jackson (57) ABSTRACT

A camera motion parameter retrieving system and solving process begins with using the equation of that the vector field divergence volume integral is equal to the total outgoing throughput passing through the surface area of the volume through the vector in conjunction with camera motion detection to solve the Motion Vectors (MVs) in the domain, followed by operation to further solve camera motion parameter respectively contains that for PAN, TILT and ZOOM while the value of the parameter represents the motion value; upon obtaining those three parameters, the moving direction of the camera motion of the present image being indicated after simple addition and subtraction operation.

4 Claims, 14 Drawing Sheets

CAMERA MOTION PARAMETER RETRIEVING SYSTEM AND SOLVING PROCESS

BACKGROUND OF THE INVENTION (a) Field of the Invention

The present invention is related to a process of solving camera motion parameter, and more particularly, to a method of solving camera motion or shooting mode by the operation of motion vectors (MV).

(b) Description of the Prior Art

Whereas detecting a moving object in an image is essentially done by means of an operation device to judge whether there is a moving object according to multiple frames of image created by an image generation device. The operation device will pick up from multiple frames of image a first frame and a second frame in succession for comparison to judge if any object has moved. In general, when there's an object moves, local changes occur to those multiple pixels contained by the frame of image created by the image generator due to the object moves. Therefore, using the operation device to compare changes between those multiple pixels respectively contained by the first and the second frames of image could serve criteria for judging if an object moves. Accordingly, whenever there are changes to those multiple pixels in the frame of image, the operation device may judge if any object moves in the image depending on the first and the second frame of image consecutively created by the image generation device.

Figure 16:
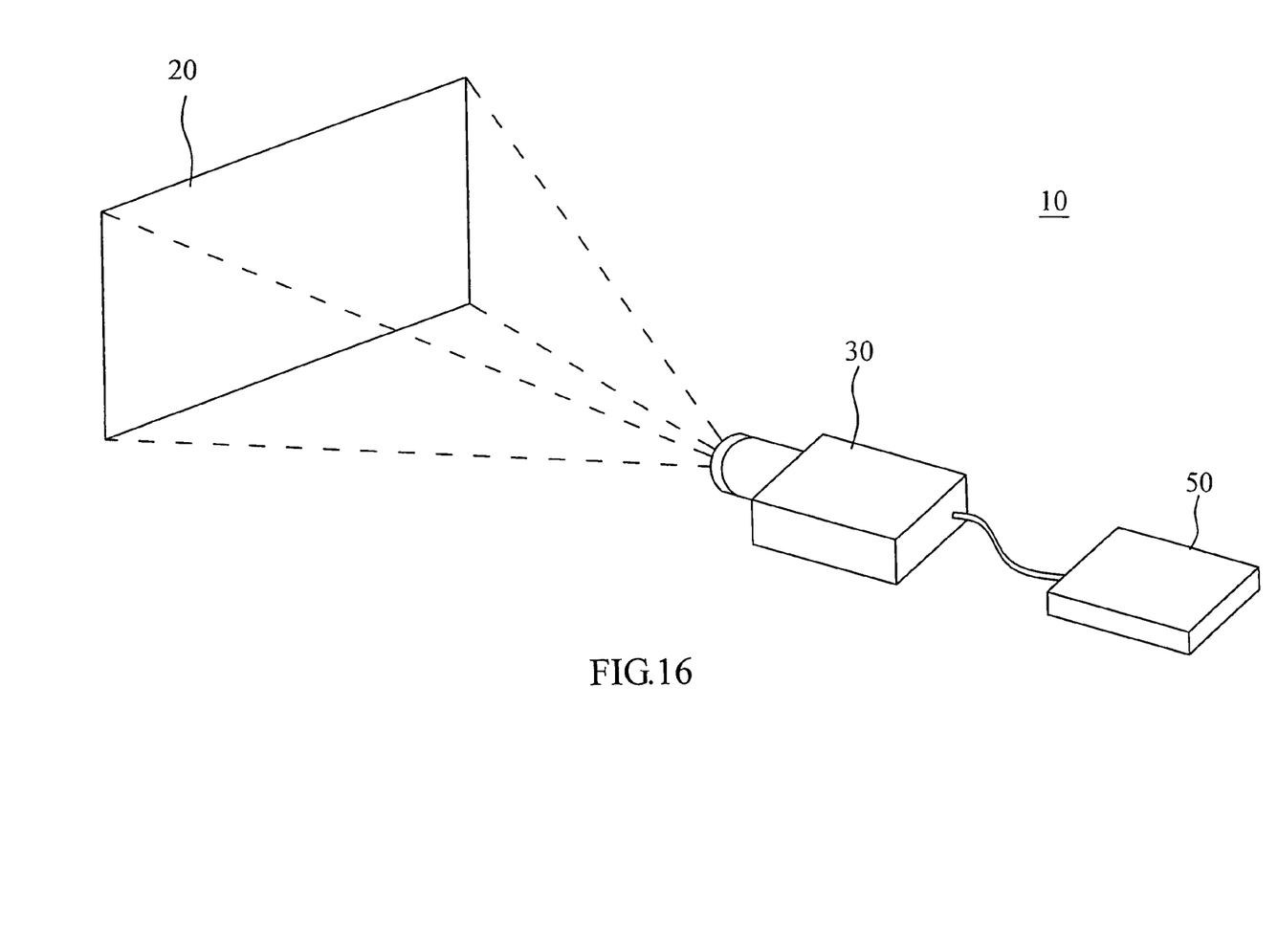
FIG. 16 is a schematic view showing a video detection system of the prior art.
Figure 17:
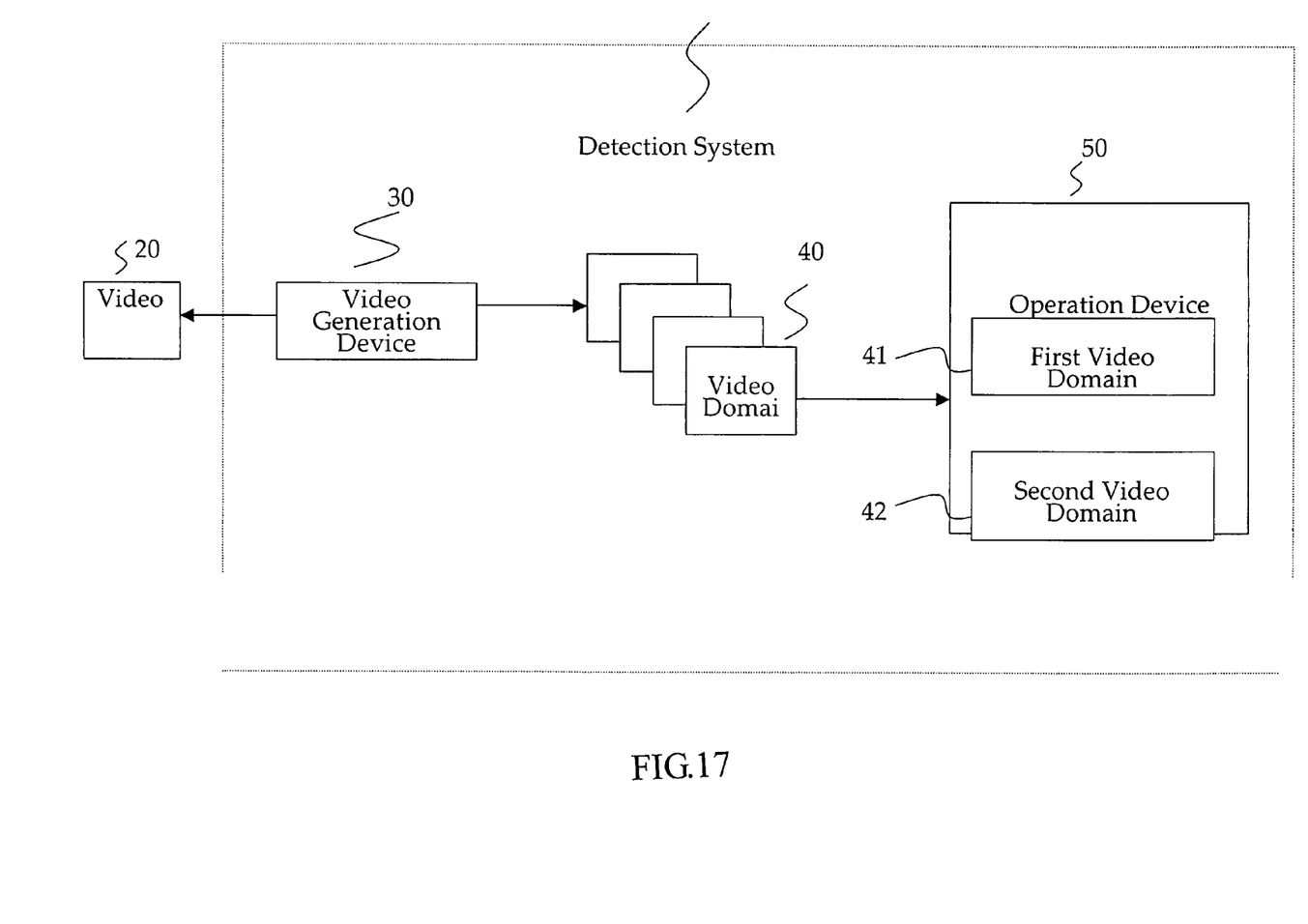
FIG. 17 is a block chart showing the functions of the video detection system of the prior art.

As illustrated in FIGS. 16 and 17 of the accompanying drawings for schematic views of a detection system generally available in the market, a detection system 10 detects if any object moves in an image 20 by a preset process for detecting a moving object. To achieve the purpose, the detection system 10 includes an image generation device 30 to shoot the image 20 and create multiple frames 40 of image at a preset retrieval speed (e.g., 30 frames/second). An operation device 50 is employed to process a first frame of image 41 and a second frame of image 42 among those multiple frames of image 40 and compare both of the first and the second frames of image 41, 42 according to the preset process for detecting a moving object to judge if any object moves in the image 20. While judging whether there's any object moving in the image 20, the operation device 50 compares each pixel in the second frame of image 42 with its corresponding pixel in the first frame of image 41 one after another so to solve the total number of pixels that are found different between the first and the second frames of image 41, 42.

However, the process to determine if an object moves or the moving direction of the object of the prior art as described above is not handy or practical due to the extremely large volume of computation involved in the comparison of corresponding pixels one after another between frames in succession by means of the operation device before solving the total number of pixels that are found different between the first and the second frames of image with specific equations.

SUMMARY OF THE INVENTION

The primary purpose of the present invention is to provide a system and solving process for retrieving camera motion parameter that allows easier way of the motion mode of a present image. To achieve the purpose, motion vectors (MVs) are availed from a domain not yet compressed, e.g., a Video Sequence, by applying the operation of Motion Estimation; or alternatively, MVs may be solved from a compression domain, e.g., a bitstream, through the operation process of motion vector extraction; and then camera motion parameter is availed using the camera motion detection method of the present invention. The parameter respectively includes PAN parameter, TILT parameter, and ZOOM parameter while the value of the parameter represents the value of the motion. Upon obtaining these three parameters, the moving direction of camera motion for the present frame is indicated after simple addition and subtraction operation. Whereas for the continuous frames there will be multiple lots of parameters, the motion mode of the present frame can be found out by taking advantage of the camera motion parameter. Therefore, putting this video frame through the MV Field operation process, we will know the camera motion mode of the video frame.

DETAILED DESCRIPTION OF THE PREFERRED EMBODIMENTS

The present invention is related to a system and solving process for retrieving camera motion parameter. Generally, the motion estimation method and the motion compensation method are applied to compress a video and motion vector (MV) is created after the operation of the motion estimation. The MV may be expressed as frame moving direction, therefore, it may be employed for the purpose of detecting camera motion.

Figure 1:
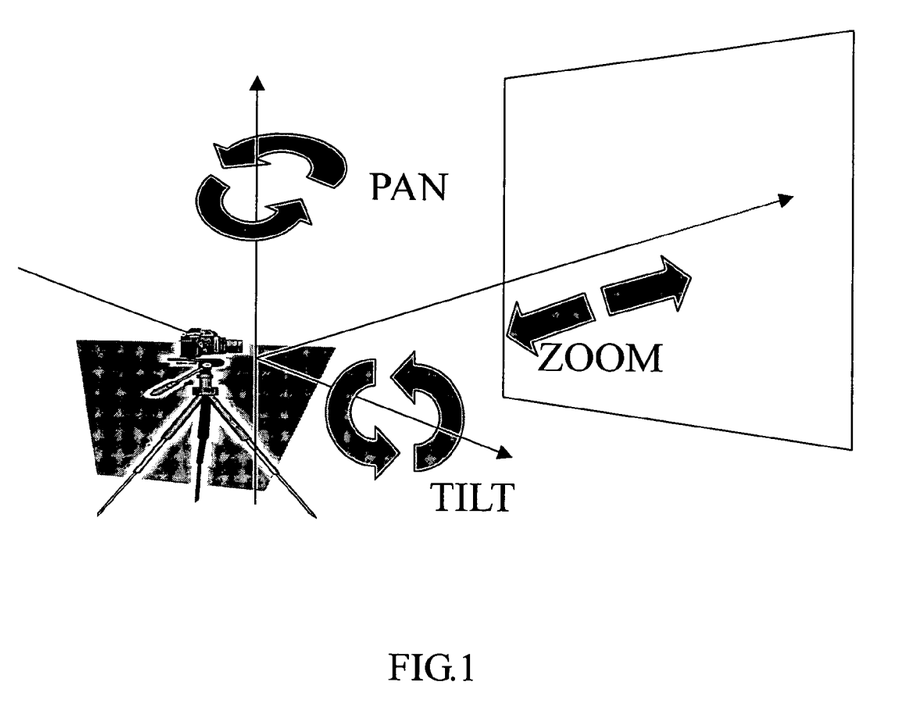
FIG. 1 is a schematic view showing the motion of moving a general camera.
Figure 2A:
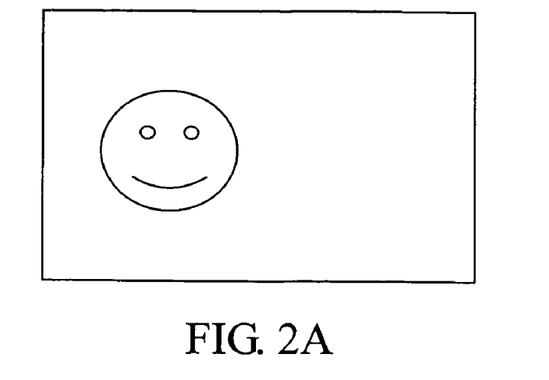
FIGS. 2A, 2B and 2C are schematic views of the frames showing the moving pattern of Pan.
Figure 2B:
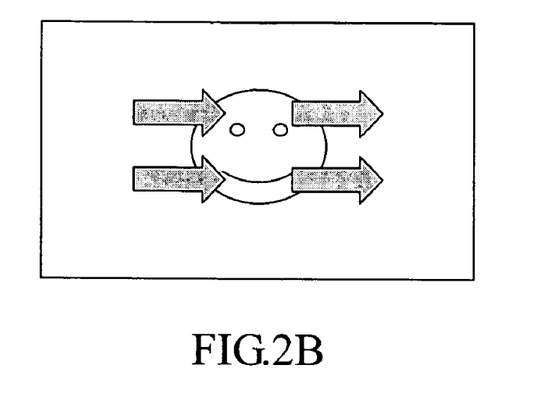
Figure 2C:
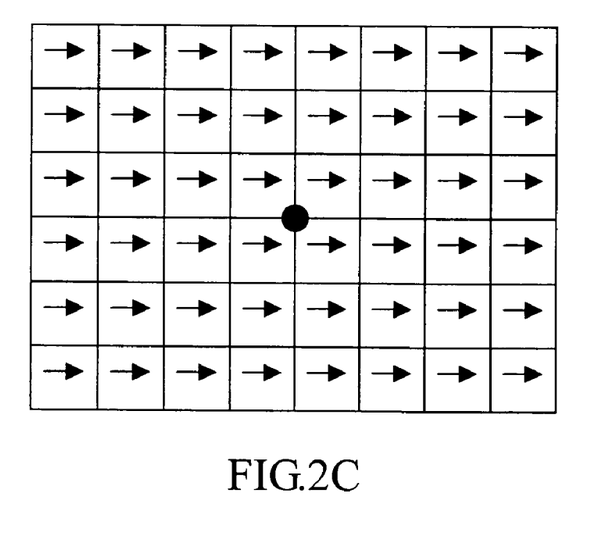

The motion vector is availed once the video frame is processed with the motion estimation method. Upon competing the motion estimation for the entire video frame, a motion filed can be plotted. Usually the camera moves in three patterns, respectively Pan, Tilt, and Zoom as illustrated in FIG. 1. Wherein, the motion of Pan indicates that during the shooting, the video moves to its right or to its left and the resultant motion vectors are leftward or rightward motion as illustrated in FIGS. 2A, 2B, and 2C. A head appearing in FIG. 2A is originally located in the left of the video. When the camera moves to its left, the head in the video moves to its right as illustrated in FIG. 2B. A rightward MV filed is availed as illustrated in FIG. 2C by putting the frame effect created by the lateral movement through the motion estimation.

Figure 3A:
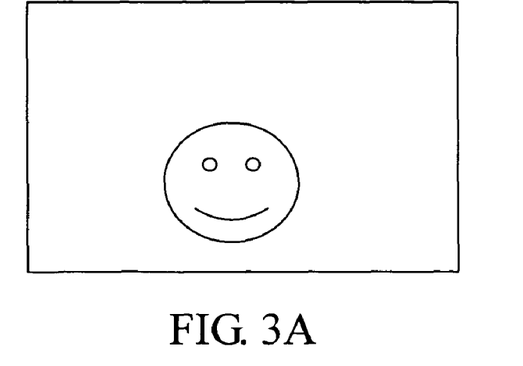
FIGS. 3A, 3B and 3C are schematic views of the frames showing the moving pattern of Tilt.
Figure 3B:
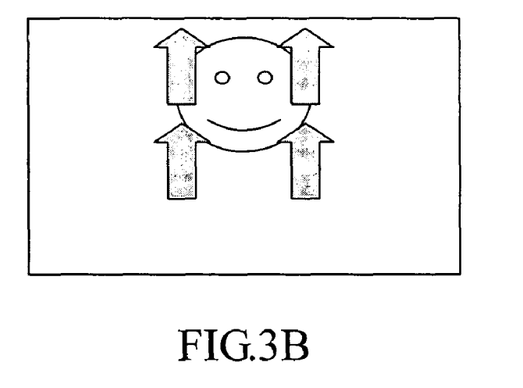
Figure 3C:
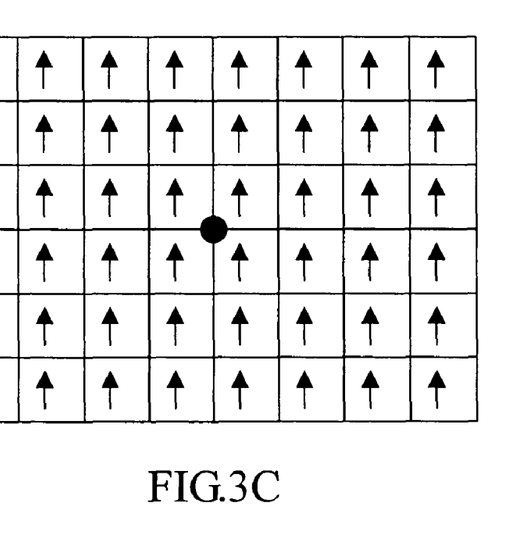

The motion of Tilt means that the contents of the frame move upward or downward during the shooting, and the resultant motion vectors are upward or downward motion as illustrated in FIGS. 3A, 3B, and 3C. A head appearing in FIG. 3A is originally located on the top of the video. When the camera moves downward, the head in the video moves to its top as illustrated in FIG. 3B. An upward MV filed is availed as illustrated in FIG. 3C by putting the frame effect created by the vertical movement through the motion estimation.

Figure 4A:
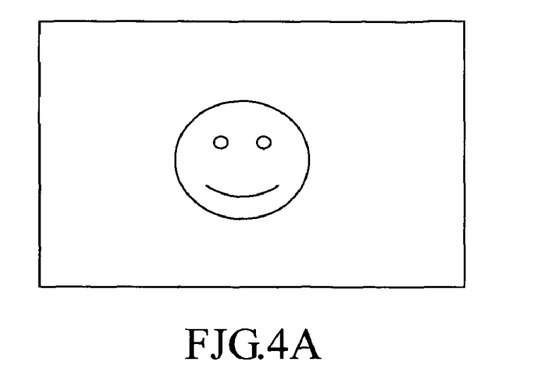
FIGS. 4A, 4B and 4C are schematic views of the frames showing the moving pattern of Zoom.
Figure 4B:
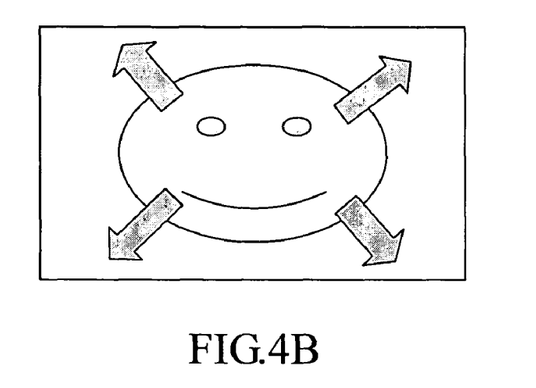
Figure 4C:
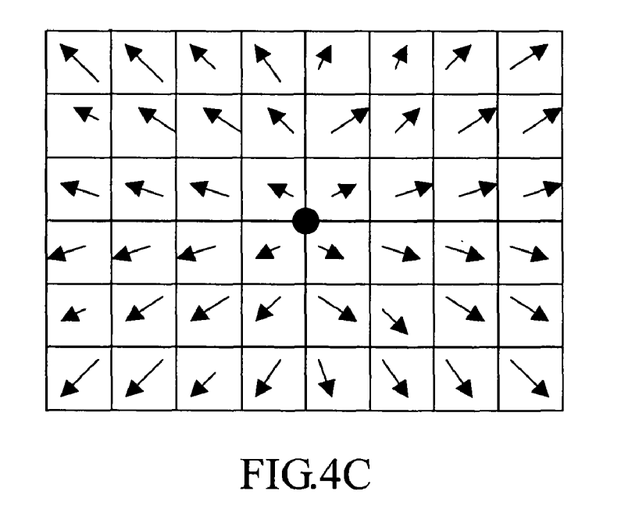

The motion of Zoom means that the camera is pulled away from or closing on during the shooting, and the resultant motion vectors are outward or inward motion as illustrated in FIGS. 4A, 4B, and 4C. A head appearing in FIG. 4A is originally located at the center of the video. When the camera moves towards the head, the head in the video indicates expansion in opposite direction as illustrated in FIG. 4B. An outward MV filed is availed as illustrated in FIG. 4C by putting the frame effect created by the zoom in or out movement through the motion estimation.

Figure 5A:
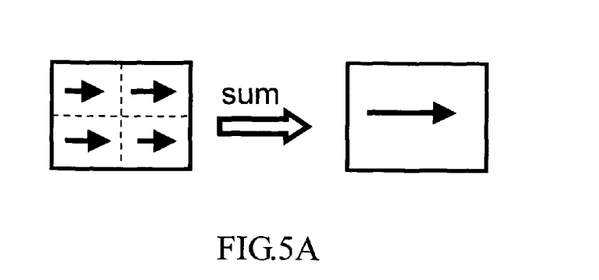
FIGS. 5A and 5B are schematic views showing the procedure of solving the sum of motion vectors in X and Y axial directions (MVx, MVy) for Motion Vector field

Accordingly, Pan, Tile, and Zoom according to the explanation by referring to FIGS. 2A, 2B, 2C, 3A, 3B, 3C, 4A, 4B, and 4C as well as the moving patterns of the camera are further respectively defined as follows:

Pan is expressed as the sum of MVx of the Motion Vectors in the direction of X axle in the motion vector field as shown in FIG. 5A.

Figure 5B:
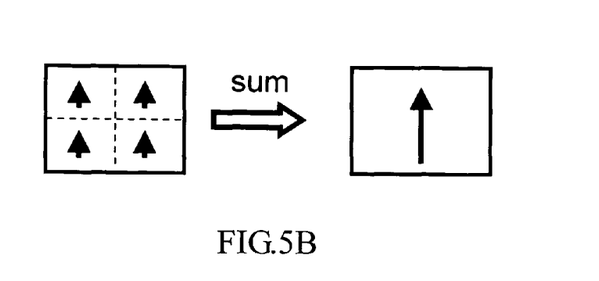

Tilt is expressed as the sum of MVy of the Motion Vectors in the direction of Y axle in the motion vector field as shown in FIG. 5B.

In detecting PAN and TILT, the MVx and MVy values in the MV Field are directly added up to become PAN and TILT parameter. The value could be extremely small if the camera stands still and there is only certain part of the video is moving, e.g., a moving person; and the accumulated value could become extremely great if the entire video moves.

Figure 5C:
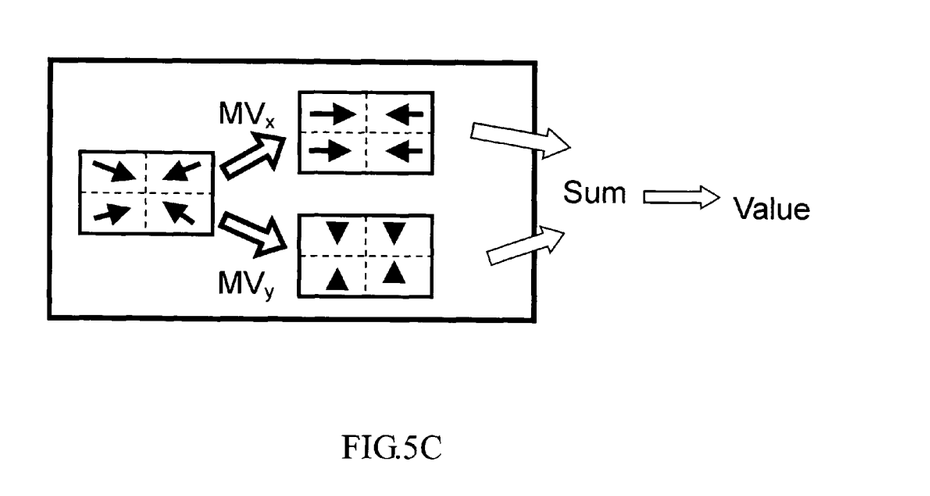
FIG. 5C is a schematic view showing the procedure of solving the sum of MVx and MVy.

Zoom is related to both of MVx and MVy. When the sum of MVx and MVy is related to a positive number, it indicates that the camera is zooming in; and if the sum of MVx and MVy is related to a negative number, it indicates that the camera is zooming out as illustrated in FIG. 5C.

Figure 6:
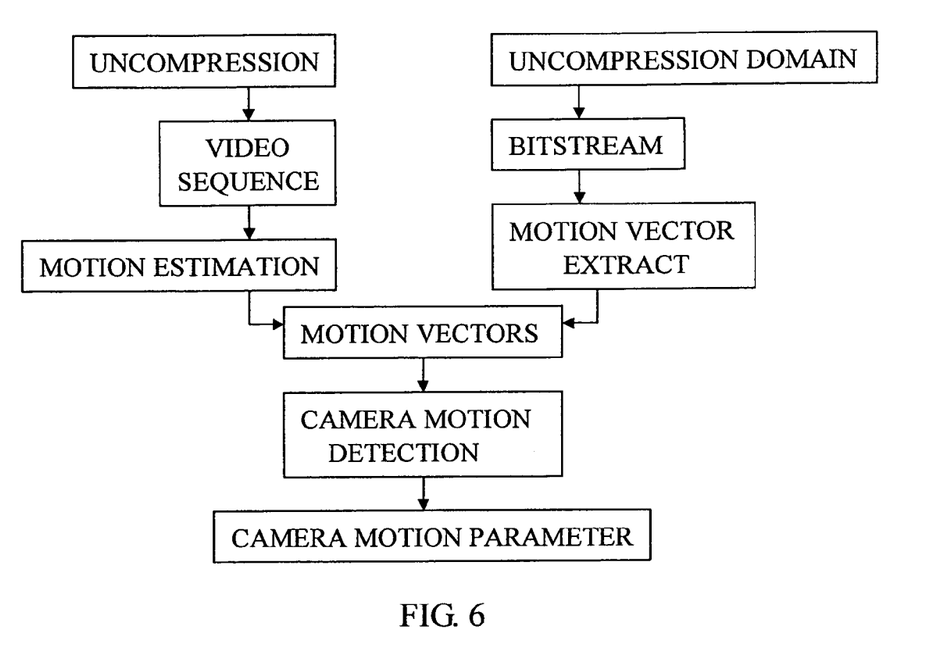
FIG. 6 is a flow chart of the present invention showing the solving process of the camera motion parameter.

Now referring to FIG. 6 showing a flow chart on how to solve the camera motion parameter, the upper left corner starts with an uncompression domain, e.g., a video sequence, and motion vectors of the video sequence is solved after the operation of motion estimation; or alternatively, in case of a compression domain, e.g., a bitstream, motion vectors in the domain are solved after the operation of motion vector extraction. Those MVs solved by using either method as described above are processed with the camera motion detection method of the present invention to come up with the camera motion parameter. The camera motion parameter respectively contains the Pan parameter, the TILT parameter, and the ZOOM parameter; and the value of the parameter represents the value of the motion. Upon those three parameters are available, they represent the moving direction of the camera motion of the present video after simple addition and subtraction operation. For continuous videos, there will be multiple lots of parameter and the parameter tells the motion mode of the present video. Therefore, the camera motion mode of the video frame becomes known by putting the video frame in the MV Field operation process.

Figure 7:
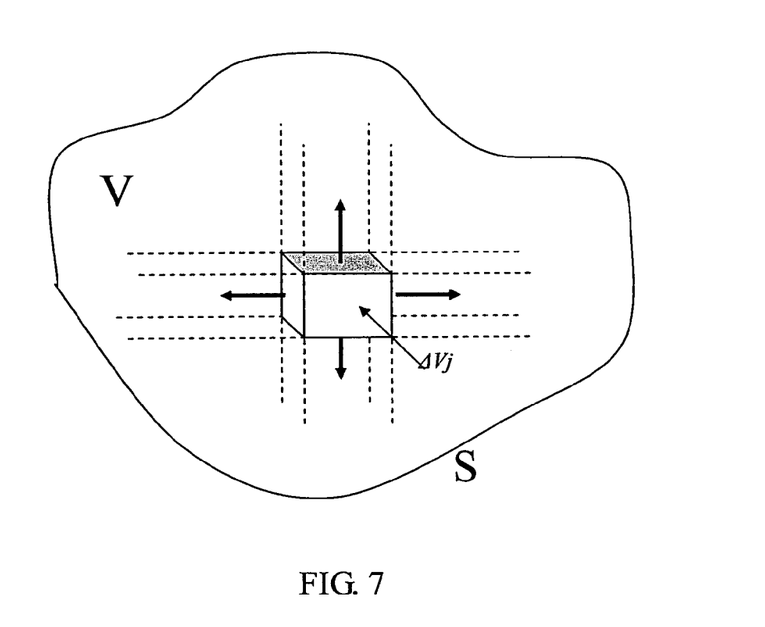
FIG. 7 is a schematic view showing a first preferred embodiment of the present invention.

As illustrated in FIG. 7, the physical significance of the present invention is that the vector field divergence volume integral is equal to the total outgoing throughput passing through the surface area of the volume through the vector expressed in an equation as follows:

$$\int_V \nabla \cdot A \, dv = C \int_S A \cdot ds$$

Wherein, A relates to a vector field and to a motion vector in the present invention. The vector field occupies a volume (V) and the Volume represents the volume of the entire vector field.

Figure 8:
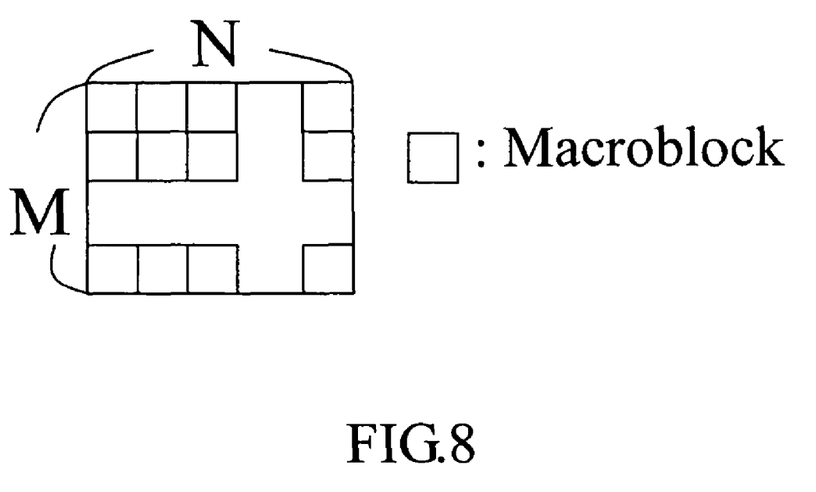
FIG. 8 is a schematic view showing a video frame.

Also referring to FIG. 8 showing that a video frame contains M×N marcoblocks (wherein, the small square relates to a marcoblock in 16×16 pixels); and M and N respectively represents the total number of macroblock in the directions of X and Y axles in the Video frame. A macroblock is provided with a Motion Vector (MV) containing Vx and Vy. MVx represents the Vx of the Motion Vector; and MVy, the Vy of the Motion Vector.

The following equations are defined for performing the camera motion detection to solve the camera motion parameter:

$$pan_1 = \sum_{j=1}^{M/2} \sum_{i=1}^{N/2} MVx(2j, 2i+1) \qquad tilt_1 = \sum_{j=1}^{M/2} \sum_{i=1}^{N/2} MVy(2j+1, i)$$

$$pan_2 = \sum_{j=1}^{M/2} \sum_{i=1}^{N/2} MVx(2j, 2i) \qquad tilt_2 = \sum_{j=1}^{M/2} \sum_{i=1}^{N/2} MVy(2j, i)$$

$$pan = pan_1 + pan_2 \qquad tilt = tilt_1 + tilt_2$$

$$zoom = \int_V \nabla \cdot MV \, dv$$

$$= \sum_{j=1}^{M/2} \sum_{i=1}^{N/2} ((MVx(2j, 2i+1) - MVx(2j, 2i)) +$$

$$(MVy(2j+1, 2i) - MVy(2j, 2i)))$$

$$= (pan_1 - pan_2) + (tilt_1 - tilt_2)$$

Figure 9A:
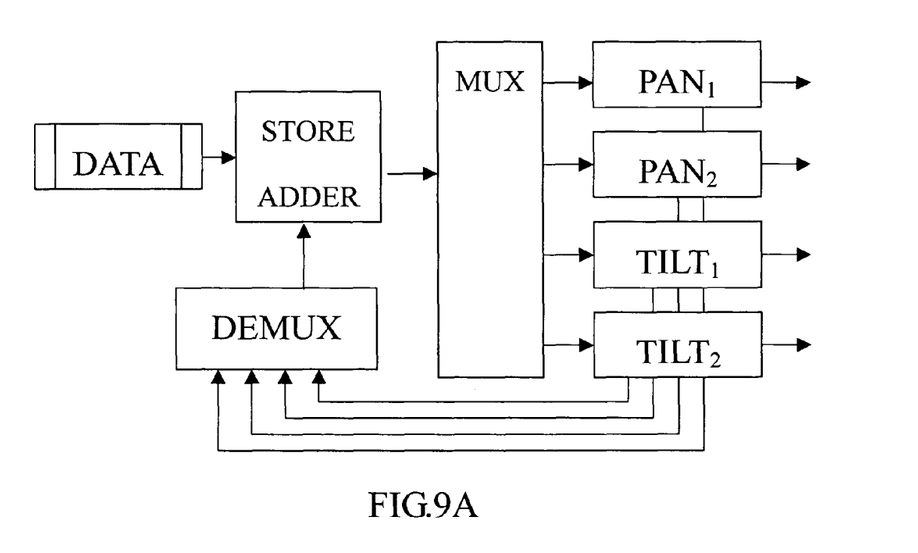
FIGS. 9A and 9B are schematic views showing the operation flow of the first preferred embodiment of the present invention.
Figure 9B:
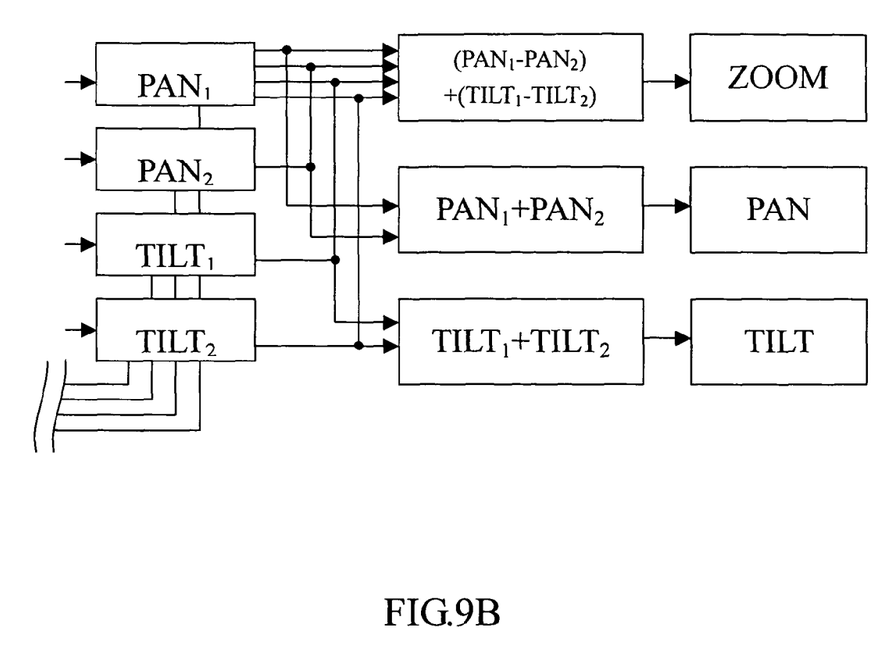

Referring to those flow charts given in FIGS. 9A and 9B, data are retrieved from the storage address of FIG. 9A in real operation for solving the primary PAN1, PAN2, TILT1, and TILT2 by means of a MUX (Multiplexer), and the values of PAN, TILT, and ZOOM are solved by following the equations given above and the process flow illustrated in FIG. 9B. Alternatively, when the accumulation status warrants, data retrieved from the storage address as illustrated in FIG. 9A are processed by the accumulation circuit MUX to solve the primary PAN1, PAN2, TILT1, and TILT2 before being further processed with an accumulation circuit DEMUX (Demultiplexer). The result is saved to the original memory unit. The memory unit is provided for saving the resultant parameter value. Data are retrieved from the storage address to go through the MUX operation once again. Accordingly, MUX and DEMUX are employed to select the parameters PAN1, PAN2, TILT1, and TILT2 to be accumulated. After repeating the cycle at a preset frequency (that is, when the entire frame is finished with the operation process), the final PAN, TILT, and ZOOM values are solved by applying those equations described above and the operation process illustrated in FIG. 9B.

Final ZOOM, PAN and TILT values generated from the process illustrated in FIG. 9B are camera motion parameters respectively containing PAN parameter, TILT parameter, and ZOOM parameter. The value of the parameter represents that of the motion. Upon these three parameters are availed, they are put through simple addition and subtraction operation to find out the moving direction of the camera motion for the present frame. Whereas there will be multiple lots of parameter for continuous videos, the camera motion parameter tells the motion mode of the present video.

Figure 10:
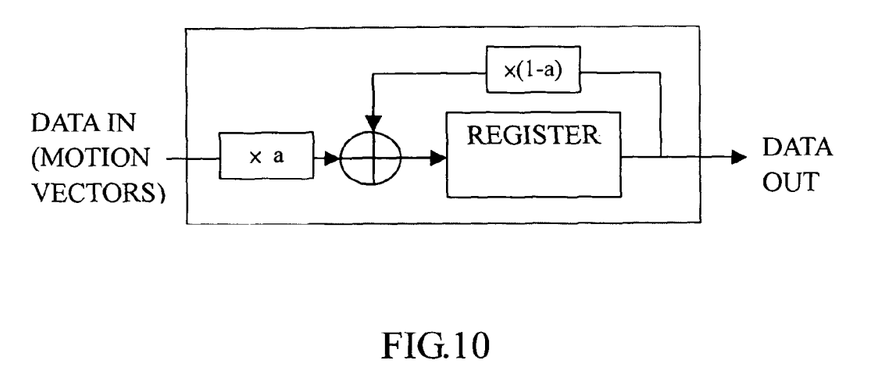
FIG. 10 is a flow chart showing the operation of IIR Filter (Infinite Impulse Response Filter) of a second preferred embodiment of the present invention.

FIG. 10 shows another preferred embodiment of the present invention related to an IIR Filter (Infinite Impulse Response Filter) serving for the purpose of solving the mean value and an operation process flow chart. Wherein, a<1 (usually a value of 0.05 is assigned). Data, e.g., motion vectors are inputted from data in to execute the operation using the mode given in FIG. 10 and output the final results (data out). Assuming that a=5%, then 1−a=95%. A register is used to save the previous results. The default of the register is set at 0. When the first lot of data is coming, it is multiplied by the value of a and the product is saved in the register. The second lot of data will be multiplied by a (5%); and the register data, by 1−a (95%). The sum of both products is put back to the register. Repeat this cycle to serve as the mean of this stream of data for solving PAN, TILT, and ZOOM values.

Figure 11:
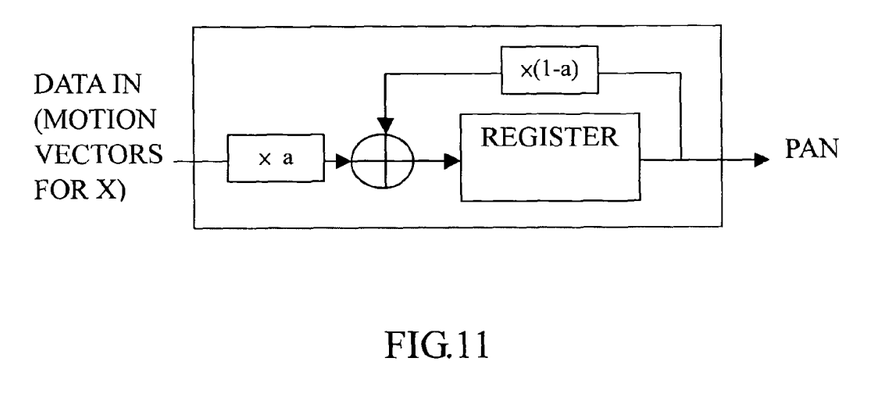
FIG. 11 is a flow chart showing the solving process of IIR Filter of PAN in the second preferred embodiment of the present invention.

Therefore the operation formulae for PAN, TILT, and ZOOM and the IIR Filter flow chart are executed as follows:

FIG. 11 shows the IIR Filter flow chart for solving PAN. The data in end is the motion vectors in X-axial direction. The formula to solve PAN value is as follows:

$$PAN(n+1)=a \times MVx(n+1)+(1-a)PAN(n)$$

Wherein, a<1 (usually a value of 0.05 is assigned).

Figure 12:
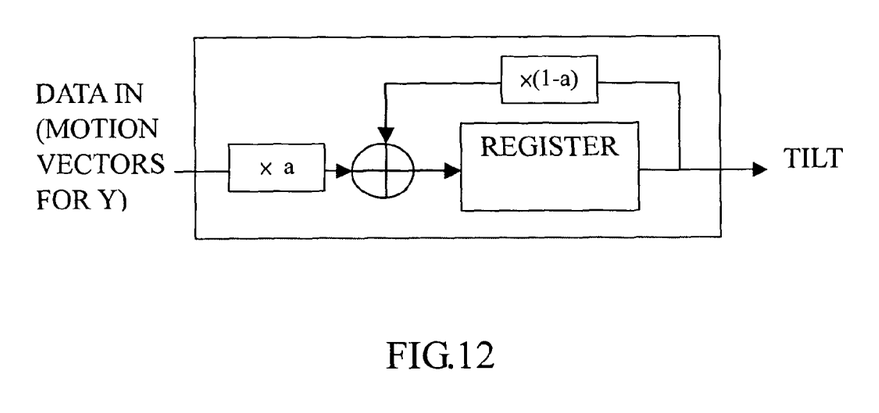
FIG. 12 is a flow chart showing the solving process of IIR Filter of TILT in the second preferred embodiment of the present invention.

FIG. 12 shows the IIR Filter flow chart for solving TILT. The data in end is the motion vectors in Y-axial direction. The formula to solve TILT value is as follows:

$$TILT(n+1)=a \times MVy(n+1)+(1-a)TILT(n)$$

Therefore, MVx and MVy are directly taken from the MV Field to serve as the mean of IIR to solve PAN and TILT parameters.

Figure 13:
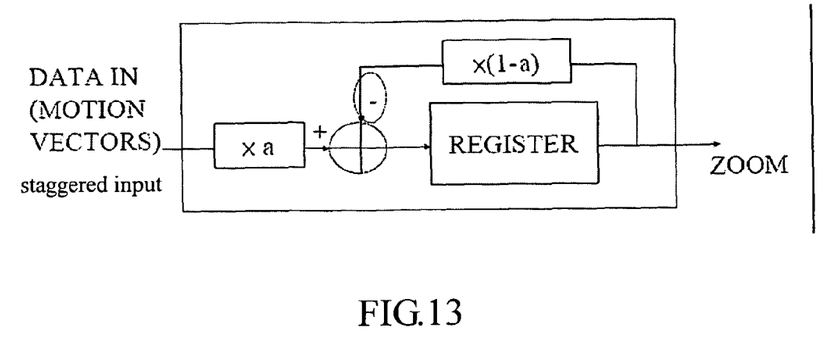
FIG. 13 is a flow chart showing the solving process of IIR Filter of ZOOM in the second preferred embodiment of the present invention.

FIG. 13 shows the IIR Filter flow chart for solving ZOOM. The data in end is X-, and Y axles associate motion vectors. The formula to solve ZOOM value is as follows:

$$ZOOM(n+1)=a \times MV(n+1)-(1-a)ZOOM(n)$$

Figure 14:
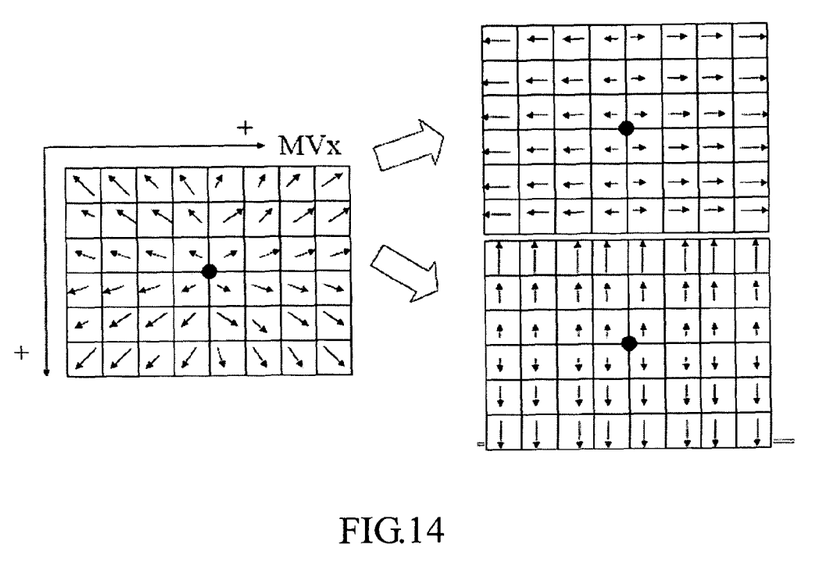
FIG. 14 is a schematic view showing that a lens of the present invention is executing ZOOM motion.

Wherein, data input sequence must be taken into consideration. For concerns over the input method of ZOOM, the configuration is changed to negative mark, where is different from that for solving PAN and TILT. Refer to FIG. 14 for considerations of ZOOM data in and a reorder circuit. FIG. 14 represents the camera motion of ZOOM IN (all is heading outwardly when seen from the central point). While the camera is doing ZOOM, the change becomes greater as going farther away from the address of the central point, i.e., the arrow grows larger; and the change becomes smaller as closing onto the address of the central point, i.e. the arrow grows smaller. MV of the ZOOM is divided into MVx and MVy for observation. Both charts in the right respectively show the direction and size of MVx and MVy:

In the upper right chart, only the MV value and direction in the direction of X are observed (positive value, rightward; and negative value, leftward) In the lower right chart, only the MV value and direction in the direction of Y are observed (positive value, downward; and negative value, upward).

Figure 15:
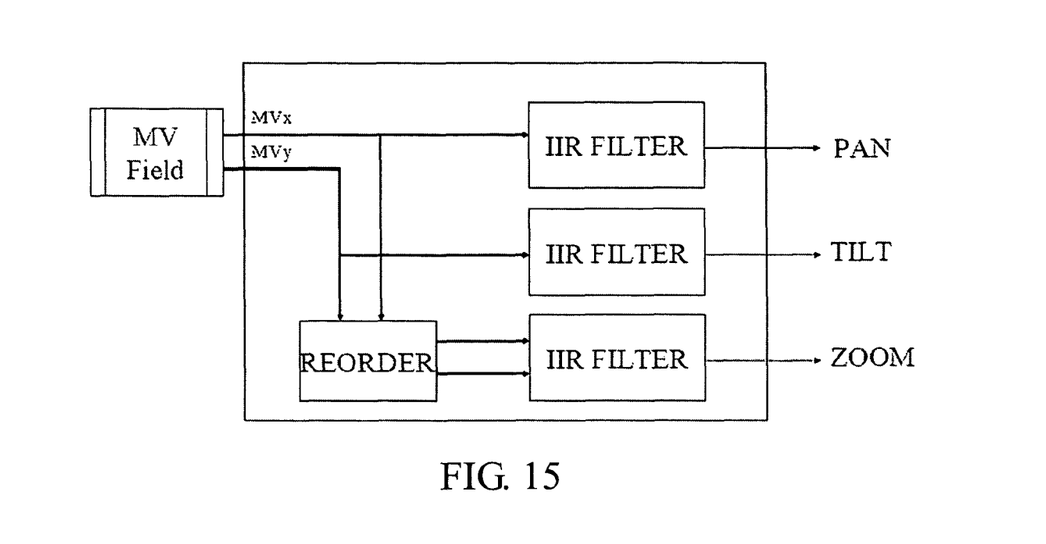
FIG. 15 is a flow chart showing the operation of camera motion detection in the second preferred embodiment of the present invention.

Because of the X-direction, the division is equally done at the central address. As observed, all MVs in the left half are all negative values; and all MVs in the right half are positive values. To make that both halves deliver positive affects upon the motion of ZOOM IN, MVs taken from the left half will be inversely processed (i.e., changing positive into negative; and negative into positive) while leaving the right half not processed. Similarly, the upper half in Y direction is inversely processed while the lower half is not processed. The camera motion indicates ZOOM IN if the final parameter is positive; and ZOOM OUT, negative. As illustrated in FIG. 15, the division of the MV Field of ZOOM allows the field to be divided into a negative block and a positive block. We therefore we have to rely upon the reorder circuit to revise the data to be inputted in positive-negative-positive-negative sequence; and the configuration of (1−a) is changed to −(1−a) to meet the ZOOM IN/OUT parameters retrieved.

PAN, TILT and ZOOM values produced from FIGS. 11, 12, and 13 are the camera motion parameters. The camera motion parameter respectively contains PAN parameter, TILT parameter, and ZOOM parameter. The value of the parameter represents that of the motion. Upon these three parameters are availed, they are put through simple addition and subtraction operation to find out the moving direction of the camera motion for the present frame. Whereas there will be multiple lots of parameter for continuous videos, the camera motion parameter tells the motion mode of the present video.

It is noted that using the camera motion detection method of the present invention will solve the camera motion parameter. The camera motion parameter respectively contains PAN parameter, TILT parameter, and ZOOM parameter; and the value of the parameter represents that of the camera motion. Upon these three parameters are available, the moving direction of the camera motion of the present video can be detected after simple addition and subtraction operation while the prior art involves much complicate arithmetic operation including addition, subtraction, multiplication, and division.

The prevent invention provides an improved system and operation process for retrieving camera motion parameter, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A process for detecting a camera's motion during shooting, comprising the steps of:
   a. providing an image data comprising consecutive first image frame and second image frame shot by the camera, wherein each of the first and second image frames comprises M number of macroblocks along a horizontal x axis and N number of macroblocks along a vertical y axis, thereby constituting a total number of MxN marcoblocks;
   b. comparing a marcoblock of the first image frame with a corresponding marcoblock of the second image frame to determine a motion vector MV having a component vector MVx along the x axis and a component vector MVy along the y axis; and c. calculating camera motion parameters of pan, tilt and zoom for the image data according to the following equations:

$$pan_1 = \sum_{j=1}^{M/2}\sum_{i=1}^{N/2} MVx(2j, 2i+1) \quad tilt_1 = \sum_{j=1}^{M/2}\sum_{i=1}^{N/2} MVy(2j+1, i)$$

$$pan_2 = \sum_{j=1}^{M/2}\sum_{i=1}^{N/2} MVx(2j, 2i) \quad tilt_2 = \sum_{j=1}^{M/2}\sum_{i=1}^{N/2} MVy(2j, i)$$

$$pan = pan_1 + pan_2 \quad tilt = tilt_1 + tilt_2$$

$$zoom = \int \nabla \cdot MV dv$$

$$= \sum_{j=1}^{M/2}\sum_{i=1}^{N/2} ((MVx(2j, 2i+1) - MVx(2j, 2i)) +$$

$$(MVy(2j+1, 2i) - MVy(2j, 2i)))$$

$$= (pan_1 - pan_2) + (tilt_1 - tilt_2)$$

wherein the camera motion parameter pan represents the camera's motion along the x axis, the camera motion parameter tilt represents the camera's motion along the y axis, and the camera motion parameter zoom represents the camera's motion of pulling away or closing on.

2. The process as claimed in claim 1, wherein the step a comprises storing the image data in a storage address, and wherein step c comprises retrieving the image data from the storage address and using a Multiplexer (MUX) to calculate the camera motion parameters.

3. A process for detecting a camera's motion during shooting, comprising the steps of:

a. providing an image data comprising consecutive first image frame and second image frame shot by the camera, wherein each of the first and second image frames comprises M number of macroblocks along a horizontal x axis and N number of macroblocks along a vertical y axis, thereby constituting a total number of MxN marcoblocks;

b. comparing a marcoblock of the first image frame with a corresponding marcroblock of the second image frame to determine a motion vector MV having a component vector MVx along the x axis and a component vector MVy along the y axis; and c. calculating camera motion parameters of pan, tilt and zoom for the image data according to the following equations:

$$PAN(n+1) = a \times MVx(n+1) + (1-a)PAN(n)$$

$$TILT(n+1) = a \times MVy(n+1) + (1-a)TILT(n)$$

$$ZOOM(n+1) = a \times MV(n+1) - (1-a)ZOOM(n)$$

wherein the constant a<1, and n is a serial number of the marcoblocks; and wherein the camera motion parameter pan represents the camera's motion along the x axis, the camera motion parameter tilt represents the camera's motion along the y axis, and the camera motion parameter zoom represents the camera's motion of pulling away or closing on.

4. The process as claimed in claim 3 wherein the constant a is 0.05.

* * * * *